US010351251B2

(12) United States Patent
Haynes et al.

(10) Patent No.: US 10,351,251 B2
(45) Date of Patent: Jul. 16, 2019

(54) AUDIO EVACUATION SYSTEM READINESS INDICATOR

(71) Applicant: GOODRICH CORPORATION, Charlotte, NC (US)

(72) Inventors: Timothy C. Haynes, Prescott Valley, AZ (US); Daniel Bahena, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 381 days.

(21) Appl. No.: 15/385,533

(22) Filed: Dec. 20, 2016

(65) Prior Publication Data

US 2018/0170559 A1 Jun. 21, 2018

(51) Int. Cl.
*B64D 25/18* (2006.01)
*B64D 25/14* (2006.01)
*B64D 45/00* (2006.01)

(52) U.S. Cl.
CPC ............. *B64D 25/18* (2013.01); *B64D 25/14* (2013.01); *B64D 45/00* (2013.01)

(58) Field of Classification Search
CPC ......... B64D 25/18; B64D 45/00; B64D 25/14
See application file for complete search history.

(56) References Cited

U.S. PATENT DOCUMENTS

| | | | | |
|---|---|---|---|---|
| 3,463,266 A * | 8/1969 | Day | ....................... | B64D 25/14 182/48 |
| 4,333,546 A * | 6/1982 | Fisher | .................... | B64D 25/14 182/48 |
| 5,209,323 A * | 5/1993 | Hopkins | .................. | A62B 1/20 182/48 |
| 6,443,259 B1 * | 9/2002 | Oney | ..................... | B64D 25/14 182/18 |
| 6,598,703 B1 * | 7/2003 | Catalan | .................... | A62B 1/20 182/48 |
| 6,814,183 B2 * | 11/2004 | Horvath | ................. | B64D 25/14 182/48 |
| 9,309,002 B2 * | 4/2016 | Fellmann | ................. | B64D 9/00 |
| 9,403,598 B2 * | 8/2016 | Deshpande | ............. | F17C 13/00 |

(Continued)

FOREIGN PATENT DOCUMENTS

EP 2987727 2/2016

OTHER PUBLICATIONS

European Patent Office, European Search Report dated Feb. 5, 2018 in Application No. 17206045.1-1010.

(Continued)

*Primary Examiner* — Justin Seo
*Assistant Examiner* — Tania C Courson
(74) *Attorney, Agent, or Firm* — Snell & Wilmer, L.L.P.

(57) ABSTRACT

An inflatable flotation device includes an inflatable body configured to be stored in a deflated state and to be inflated in response to an event. The inflatable flotation device also includes a switch attached to the inflatable body and configured to switch from an off state to an on state in response to the inflatable body being inflated at least one of to or beyond a predetermined inflation level. The inflatable flotation device also includes a speaker attached to the inflatable body, electrically coupled to the switch, and configured to generate an audio signal indicating that the inflatable body is ready for use in response to the switch being switched from the off state to the on state.

14 Claims, 6 Drawing Sheets

(56) References Cited

U.S. PATENT DOCUMENTS

| | | | | |
|---|---|---|---|---|
| 10,112,063 B1* | 10/2018 | White | ............... | G08B 25/12 |
| 10,131,440 B2* | 11/2018 | Volny | ............... | B64D 25/14 |
| 10,160,551 B2* | 12/2018 | Hartman | ............... | B64D 47/02 |
| 2005/0077426 A1 | 4/2005 | Simard | | |
| 2005/0115794 A1* | 6/2005 | Zonneveld | ............... | A62B 3/00 |
| | | | | 193/5 |
| 2006/0252563 A1* | 11/2006 | Werner | ............... | A63G 21/18 |
| | | | | 472/117 |
| 2008/0200094 A1* | 8/2008 | Hsu | ............... | A63H 27/10 |
| | | | | 446/226 |
| 2009/0136076 A1* | 5/2009 | Chi | ............... | H04R 1/026 |
| | | | | 381/387 |
| 2012/0300435 A1* | 11/2012 | Hill | ............... | B63C 9/20 |
| | | | | 362/103 |
| 2013/0075524 A1* | 3/2013 | Islam | ............... | B64D 25/00 |
| | | | | 244/118.5 |
| 2014/0291070 A1* | 10/2014 | White | ............... | A62B 1/20 |
| | | | | 182/49 |
| 2015/0034769 A1* | 2/2015 | Minchau | ............... | B64D 25/14 |
| | | | | 244/137.2 |
| 2015/0097083 A1 | 4/2015 | Fellmann | | |
| 2018/0251224 A1* | 9/2018 | Bahena | ............... | B64D 25/08 |
| 2018/0251225 A1* | 9/2018 | Kruts | ............... | B63C 9/22 |
| 2018/0273189 A1* | 9/2018 | Haynes | ............... | B63C 9/22 |

OTHER PUBLICATIONS

European Patent Office, European Office Action dated Feb. 4, 2019 in Application No. 17206045.1.

* cited by examiner

AUDIO EVACUATION SYSTEM READINESS INDICATOR

FIELD

The present disclosure is directed to evacuation systems for use in aircraft and, more particularly, to systems for providing an indication of when an inflatable flotation device is sufficiently inflated for use.

BACKGROUND

Aircraft evacuation systems typically include a source of forced gas and an inflatable flotation device. The source of forced gas may include a charged gas cylinder and an aspirator. The aspirator, working with the charged gas cylinder, provides gas to inflate the inflatable flotation device.

The inflatable flotation device is deployed in response to an action taken by a passenger or crew member. Upon deployment, the source of forced gas forces the gas into the inflatable flotation device, causing inflation of the inflatable flotation device. It may be undesirable for passengers or crew members to board the inflatable flotation device while the inflatable flotation device is underinflated.

SUMMARY

Described herein is an inflatable flotation device for use with an aircraft. The inflatable flotation device includes an inflatable body configured to be stored in a deflated state and to be inflated in response to an event. The inflatable flotation device also includes a switch attached to the inflatable body and configured to switch from an off state to an on state in response to the inflatable body being inflated at least one of to or beyond a predetermined inflation level. The inflatable flotation device also includes a speaker attached to the inflatable body, electrically coupled to the switch, and configured to generate an audio signal indicating that the inflatable body is ready for use in response to the switch being switched from the off state to the on state.

In any of the foregoing embodiments, the switch is an activation lanyard having a base portion attached to a first location on the inflatable body and a detachable portion attached to a second location on the inflatable body such that the detachable portion remains attached to the base portion until the inflatable body is inflated at least one of to or beyond the predetermined inflation level and the activation lanyard switches to the on state in response to the detachable portion being detached from the base portion.

Any of the foregoing embodiments may also include a battery configured to store electrical energy and wherein the base portion of the activation lanyard is positioned within or attached to the battery.

In any of the foregoing embodiments, the detachable portion of the activation lanyard includes a line having a first end attached to the inflatable body and a second end, and an attachment portion coupled to the second end of the line and configured to be attached to the base portion via at least one of a snap fit feature or at least one magnet.

In any of the foregoing embodiments, the inflatable body includes a proximate end that is nearest to the aircraft during inflation, a distal end that is farthest from the aircraft during inflation, and two sides that each connect the proximate end to the distal end and wherein the switch is positioned on the distal end of the inflatable body and the speaker is positioned at the proximate end of the inflatable body.

Any of the foregoing embodiments may also include a light source attached to the inflatable body, electrically coupled to the switch, and configured to generate light indicating that the inflatable body is ready for use in response to the switch being switched from the off state to the on state.

Any of the foregoing embodiments may also include a battery electrically coupled to the switch and to the speaker and configured to provide electrical energy to the speaker in response to the switch being in the on state.

Any of the foregoing embodiments may also include at least one wire electrically coupled to the speaker and configured to be electrically coupled to a power source of the aircraft, wherein electrical power is transferred from the power source of the aircraft to the speaker in response to the switch being in the on state.

Also described is in inflatable flotation device for use with an aircraft. The inflatable flotation device includes an inflatable body configured to be stored in a deflated state and to be inflated in response to an event. The inflatable flotation device also includes a switch attached to the inflatable body and configured to switch from an off state to an on state in response to the inflatable body being inflated at least one of to or beyond a predetermined inflation level. The inflatable flotation device also includes a light source attached to the inflatable body, electrically coupled to the switch, and configured to generate light data indicating that the inflatable body is ready for use in response to the switch being switched from the off state to the on state.

In any of the foregoing embodiments, the switch is an activation lanyard having a base portion attached to a first location on the inflatable body and a detachable portion attached to a second location on the inflatable body such that the detachable portion remains attached to the base portion until the inflatable body is inflated at least one of to or beyond the predetermined inflation level and the activation lanyard switches to the on state in response to the detachable portion being detached from the base portion.

Any of the foregoing embodiments may also include a battery configured to store electrical energy and wherein the base portion of the activation lanyard is positioned within or attached to the battery.

In any of the foregoing embodiments, the detachable portion of the activation lanyard includes a line having a first end attached to the inflatable body and a second end, and an attachment portion coupled to the second end of the line and configured to be attached to the base portion via at least one of a snap fit feature or at least one magnet.

In any of the foregoing embodiments, the inflatable body includes a proximate end that is nearest to the aircraft during inflation, a distal end that is farthest from the aircraft during inflation, and two sides that each connect the proximate end to the distal end and wherein the switch is positioned on the distal end of the inflatable body and the light source is positioned at the proximate end of the inflatable body.

Any of the foregoing embodiments may also include a battery electrically coupled to the switch and to the light source and configured to provide electrical energy to the light source in response to the switch being in the on state.

Any of the foregoing embodiments may also include at least one wire electrically coupled to the light source and configured to be electrically coupled to a power source of the aircraft, wherein electrical power is transferred from the power source of the aircraft to the light source in response to the switch being in the on state.

Also described is in evacuation system for use with an aircraft. The evacuation system includes a source of forced gas coupled to the aircraft. The evacuation system also includes an inflatable flotation device. The inflatable flotation device includes an inflatable body configured to be stored in a deflated state and to be inflated by the source of forced gas in response to an event. The inflatable flotation device also includes a switch attached to the inflatable body and configured to switch from an off state to an on state in response to the inflatable body being inflated at least of to or beyond a predetermined inflation level. The inflatable flotation device also includes at least one of a speaker or a light source attached to the inflatable body, electrically coupled to the switch, and configured to generate at least one of audio data or light data indicating that the inflatable body is ready for use in response to the switch being switched from the off state to the on state.

In any of the foregoing embodiments, the switch is an activation lanyard having a base portion attached to a first location on the inflatable body and a detachable portion attached to a second location on the inflatable body such that the detachable portion remains attached to the base portion until the inflatable body is inflated at least one of to or beyond the predetermined inflation level and the activation lanyard switches to the on state in response to the detachable portion being detached from the base portion.

In any of the foregoing embodiments, the inflatable flotation device further includes a battery configured to store electrical energy and wherein the base portion of the activation lanyard is positioned within or attached to the battery.

In any of the foregoing embodiments, the detachable portion of the activation lanyard includes a line having a first end attached to the inflatable body and a second end, and an attachment portion coupled to the second end of the line and configured to be attached to the base portion via at least one of a snap fit feature or at least one magnet.

In any of the foregoing embodiments, the inflatable body includes a proximate end that is nearest to the aircraft during inflation, a distal end that is farthest from the aircraft during inflation, and two sides that each connect the proximate end to the distal end and wherein the switch is positioned on the distal end of the inflatable body and the at least one of the speaker or the light source is positioned at the proximate end of the inflatable body.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
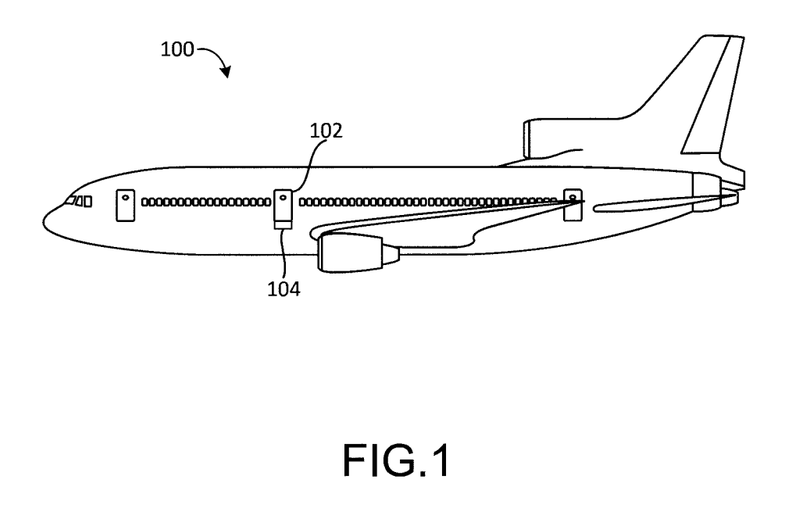
FIG. 1 is a drawing of an aircraft having an exit door and an evacuation system, in accordance with various embodiments.

Referring now to FIG. 1, an aircraft 100 is shown. The aircraft 100 may include a plurality of exit doors including an exit door 102. The aircraft 100 may include one or more evacuation systems positioned near a corresponding exit door. For example, the aircraft 100 includes an evacuation system 104 positioned near the exit door 102. In the event of an emergency, the exit door 102 may be opened by a passenger or crew member of the aircraft 100. In various embodiments, the evacuation system 104 may deploy in response to the exit door 102 being opened and, in various embodiments, the evacuation system 104 may deploy in response to another action taken by a passenger or crew member such as depression of a button or actuation of a lever.

Figure 2:
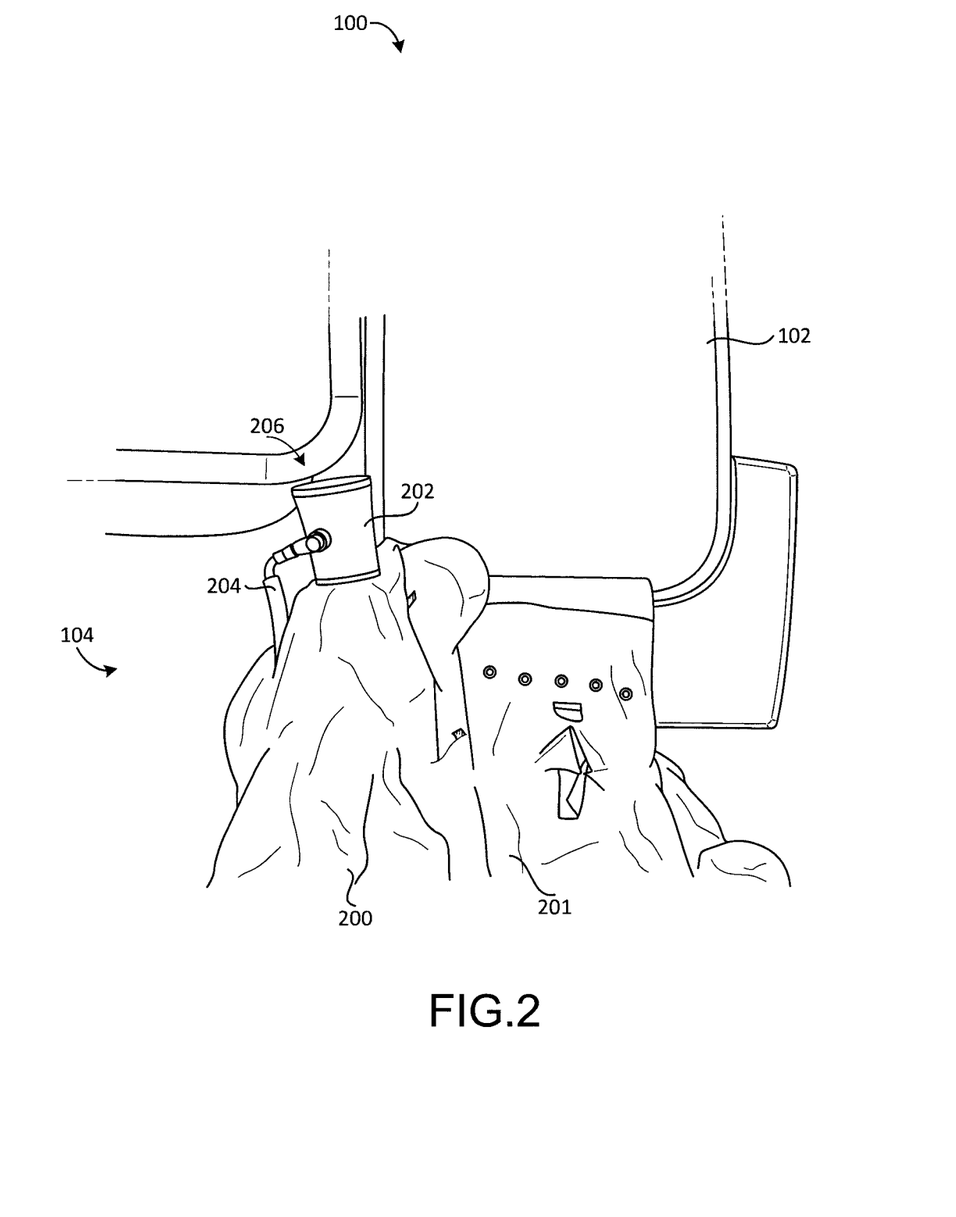
FIG. 2 is a drawing of the evacuation system of FIG. 1 including an inflatable flotation device in a deflated state, in accordance with various embodiments.

Turning to FIG. 2, additional details of the evacuation system 104 are illustrated. In particular, the evacuation system 104 includes an inflatable flotation device 200 that has an inflatable body 201. The evacuation system 104 further includes a source of forced gas 206. The source of forced gas 206 may cause a gas to enter the inflatable body 201 to inflate the inflatable body 201.

The source of forced gas 206 may include an aspirator 202 coupled to the inflatable body 201 and piping 204 coupled to the aspirator 202. Under normal operating conditions, the inflatable body 201 may be deflated and stored within a compartment of the aircraft 100. In response to deployment of the evacuation system 104, fluid may flow into the aspirator 202 via the piping 204 at a relatively high velocity. This fluid flow may cause the aspirator 202 to draw air from the environment. The fluid flow (such as in a gaseous state) and the air may be directed into the inflatable body 201. In response to receiving the fluid flow and the air, the inflatable body 201 may begin to inflate.

Figure 3:
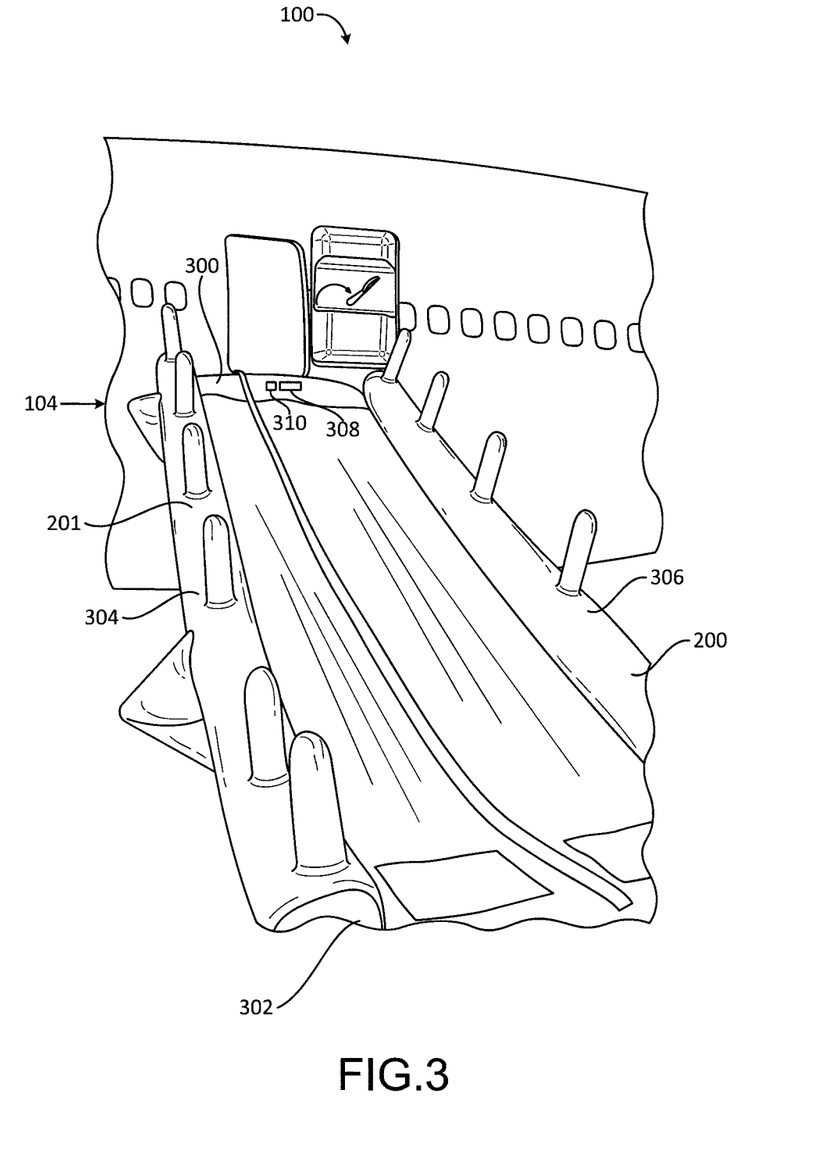
FIG. 3 is a drawing of the evacuation system of FIG. 1 including an inflatable flotation device in an inflated state, in accordance with various embodiments.

Turning now to FIG. 3, the evacuation system 104 is illustrated in a fully deployed state. As shown, the inflatable body 201 is fully inflated and may resemble a raft. In that regard, the inflatable flotation device 200 may be detached from the aircraft 100 such that passengers may safely float away from the aircraft 100 on the inflatable flotation device 200.

The inflatable body 201 has a proximate end 300 that is positioned nearest the aircraft 100 during inflation of the inflatable body 201. The inflatable body 201 further has a distal end 302 (better illustrated in FIG. 9) that is positioned farthest from the aircraft 100 during inflation of the inflatable body 201. The inflatable body 201 further includes a first side 304 and a second side 306 that each connects the proximate end 300 to the distal end 302. In various embodiments, one or more of the proximate end 300, the distal end 302, the first side 304, or the second side 306 may include an inflatable compartment, such as a compartment defined by a tube. In various embodiments, the compartments may be in fluid communication with each other and, in various embodiments, the compartments may be isolated from each other.

Referring briefly to FIGS. 2 and 3, it is undesirable for passengers to move on to the inflatable flotation device 200 before the inflatable body 201 is inflated at least one of to or beyond a predetermined inflation level (i.e., to and beyond, each meaning: to the level, beyond the level, or a combination thereof). Thus, it is desirable for the inflatable flotation device 200 to indicate that persons may load onto the inflatable flotation device 200 in response to the inflatable body 201 being inflated at least one of to or beyond the predetermined inflation level. The predetermined inflation level may be an inflation level beyond which passengers may begin to move on to the inflatable flotation device 200. For example, the predetermined inflation level may correspond to a physical inflation level, such as when the inflatable body 201 is 50 percent inflated, 70 percent inflated, 90 percent inflated, 98 percent inflated, or the like.

In various embodiments, the predetermined inflation level may correspond to a predetermined pressure within the inflatable body 201 such that the predetermined inflation level is reached when the pressure within the inflatable body 201 reaches the predetermined pressure. For example, the predetermined pressure may be between 10 pounds per square inch (PSI, 68.9 Kilopascal (kPa) and 40 PSI (276 kPa), between 15 PSI (103 kPa) and 30 PSI (207 kPa), or between 20 PSI (138 kPa) and 40 PSI (276 kPa).

It may be desirable to inform passengers and crew members that they may move onto the inflatable body 201 in response to the inflatable body 201 being sufficiently inflated in dark or other low visibility situations. In that regard, the inflatable flotation device 200 may include a light source 308 and a speaker 310 attached to the inflatable body 201 that each may indicate when the inflatable body 201 is sufficiently inflated.

The light source 308 and the speaker 310 may be connected to a switch (such as the switch 400 of FIG. 4) which controls the light source 308 and the speaker 310 based on the inflation level of the inflatable body 201. In particular, in response to the inflatable body 201 being inflated at least one of to or beyond the predetermined inflation level, the switch may be switched from an off state to an on state. In response to the switch being switched to the on state, the light source 308 may generate light data and the speaker 310 may generate an audio signal to indicate that passengers and crew members may begin to move on to the inflatable flotation device 200.

For example, in response to the switch being switched to the on state, the light source 308 may generate a light, such as green light. As another example, the light source 308 may have a shape, such as the word "go," that illuminates in response to the switch being switched to the on state. The speaker 310 may generate an audio signal such as "you may now enter the flotation device" or "the raft is ready for use" in response to the switch being switched to the on state.

Figure 4:
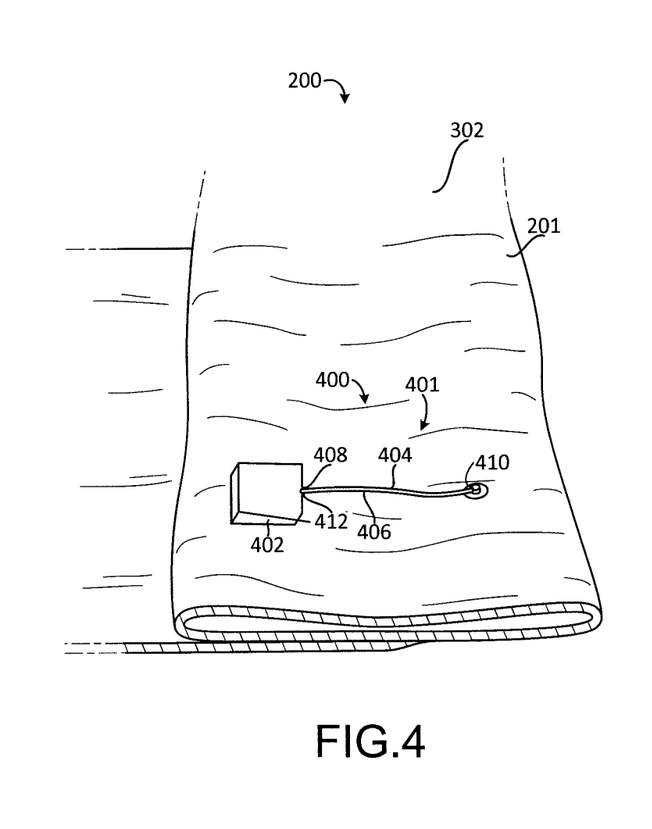
FIG. 4 is a drawing of an activation lanyard acting as a switch for the inflatable flotation device of FIG. 2 and being in an off state, in accordance with various embodiments.
Figure 5:
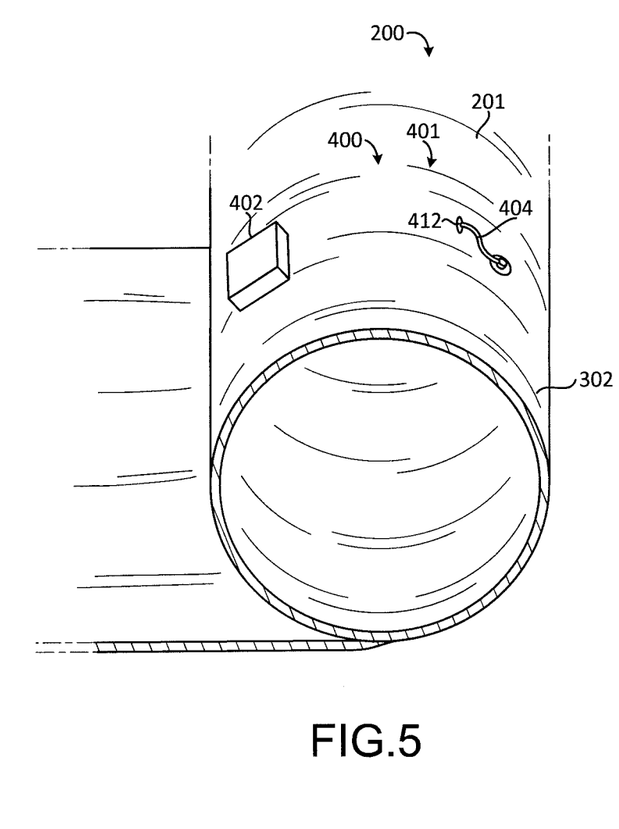
FIG. 5 is a drawing of an activation lanyard acting as a switch for the inflatable flotation device of FIG. 2 and being in an on state, in accordance with various embodiments.

Referring now to FIGS. 4 and 5 and in various embodiments, the switch 400 may include an activation lanyard 401. The activation lanyard 401 may be coupled to the inflatable body 201. In various embodiments, the activation lanyard 401 may be positioned on the distal end 302 of the inflatable body 201.

The activation lanyard 401 may include a base portion 402 and a detachable portion 404. The base portion 402 may be physically attached to the inflatable body 201. The detachable portion 404 may include a line 406 having a first end 410 and a second end 408. The first end 410 may be physically attached to the inflatable body 201. The second end 408 may include an attachment portion 412 that is removably coupled to the base portion 402.

When the inflatable body 201 is deflated, as shown in FIG. 4, the attachment portion 412 of the detachable portion 404 is attached to the base portion 402. While the detachable portion 404 is attached to the base portion 402, the switch 400 may be in an off state. As the inflatable body 201 begins to inflate, tension may form between the first end of the line 406 and the attachment portion 412 of the line 406. In response to the inflatable body 201 being inflated at least one of to or beyond the predetermined inflation level, the tension on the line 406 may be sufficiently great to cause the attachment portion 412 to be disconnected from the base portion 402. In response to this disconnection, the switch is switched to the on state. In response to the switch being switched to the on state, power may be provided to the light source 308 and/or the speaker 310 of FIG. 3, allowing them to output data indicating that the inflatable flotation device 200 is ready for use.

Figure 6:
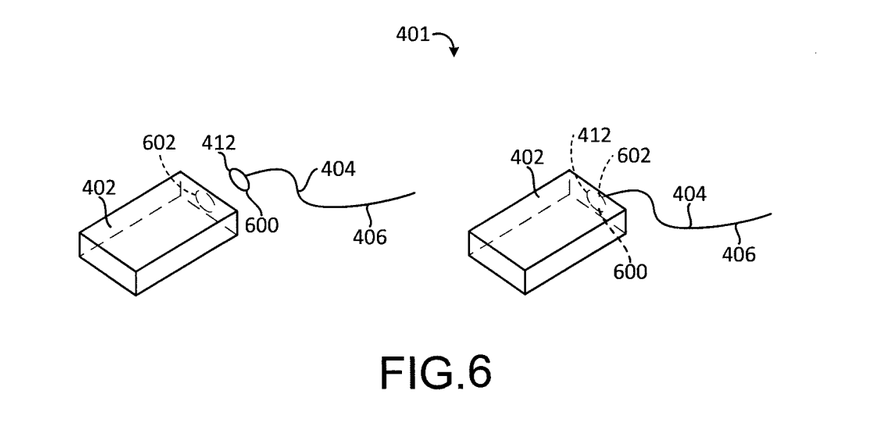
FIG. 6 is a drawing of the activation lanyard of FIG. 4 illustrating details of the activation lanyard, in accordance with various embodiments.

Turning now to FIG. 6, additional details of the activation lanyard 401 are shown. The base portion 402 may include a metal or magnet 602, and the detachable portion 404 may include a metal or magnet 600 on the attachment portion 412. Magnetic attraction between the metal or magnet 602 and the metal or magnet 600 may cause the attachment portion 412 to be physically attached to the base portion 402. In response to sufficient tension being placed on the line 406, the metal or magnet 600 of the attachment portion 412 may be insufficient to cause the attachment portion 412 to remain attached to the base portion 402, and the attachment portion 412 may become detached from the base portion 402.

Figure 7:
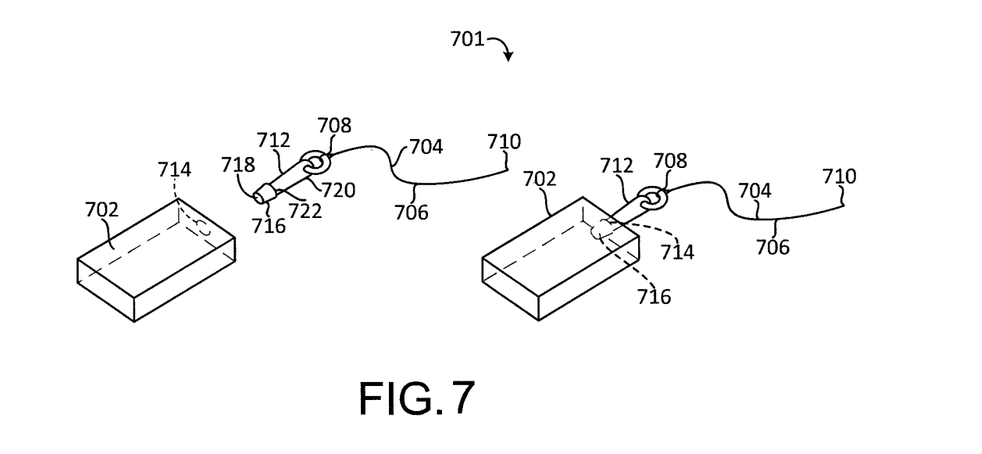
FIG. 7 is a drawing of another activation lanyard usable as a switch for an inflatable flotation device, in accordance with various embodiments.

Turning to FIG. 7, an alternative activation lanyard 701 is shown. The alternative activation lanyard 701 includes a base portion 702 and a detachable portion 704. The base portion 702 includes an aperture 714. The detachable portion 704 includes a line 706 having a first end 710 designed to be attached to an inflatable body and a second end 708 attached to an attachment portion 712. The attachment portion 712 includes a snap fit feature 716.

The snap fit feature 716 has an insertable end 718 designed to be received by the aperture 714. The snap fit feature 716 further includes a body 720. A lip 722 may be positioned between the insertable end 718 and the body 720 and may be defined by the insertable end 718. The insertable end 718 may be tapered towards the lip 722. The lip 722 may have a greater diameter than the portion of the body 720 nearest the lip 722. In that regard, the insertable end 718 may be inserted into the aperture 714 until the lip 722 has extended through the aperture 714. The lip 722 may cause the insertable end 718 to remain within the base portion 702 until a sufficient amount of tension is applied to the line 706. In response to sufficient tension being applied to the line 706, the lip 722 may no longer resist the tension of the line 706 such that the insertable end 718 is removed from the base portion 702 via the aperture 714. The snap fit feature 716 may be referred to as a snap fit feature because the insertable end 718 may "snap" into place within the base portion 702 in response to the lip 722 extending through the aperture 714.

Figure 8:
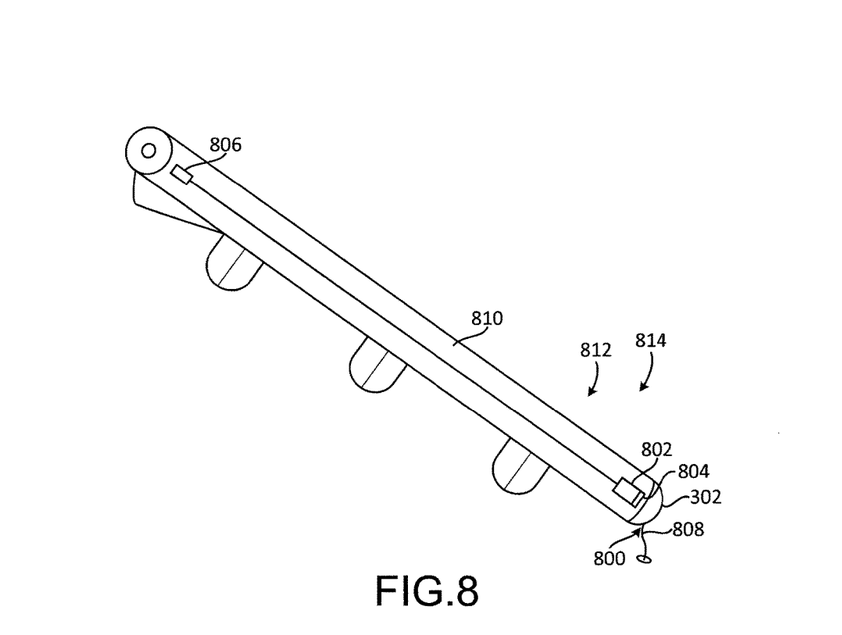
FIG. 8 is a drawing of a first side of an inflatable flotation device having a switch, a battery, and a speaker, in accordance with various embodiments.

Turning to FIG. 8, an inflatable flotation device 812 may include a switch, or activation lanyard 800, positioned on a first side 810 of an inflatable body 814. The inflatable flotation device 812 may also include a battery 802 and a speaker 806. The battery 802 may be designed to store electrical energy and to provide electrical energy to the speaker 806 in response to the inflatable body 814 being inflated at least one of to or beyond the predetermined inflation level.

The activation lanyard 800 may include a detachable portion 808 and a base portion 804. As shown in FIG. 8, the base portion 804 may be designed to be positioned within, or attached to, the battery 802. The battery 802 and the base portion 804 may be designed such that the battery 802 may provide electrical energy to the speaker 806 in response to the detachable portion 808 being detached from the base portion 804. For example, in response to the detachable portion 808 becoming detached from the base portion 804, a circuit may be closed, resulting in power being provided to the speaker 806. In that regard, in response to the first side 810 being inflated at least one of to or beyond the predetermined inflation level, the detachable portion 808 of the activation lanyard 800 may become detached from the base portion 804. In response to this detachment, the battery 802 may provide electrical energy to the speaker 806 which may then output an audio signal indicating that the inflatable flotation device 812 is ready for use.

Figure 9:
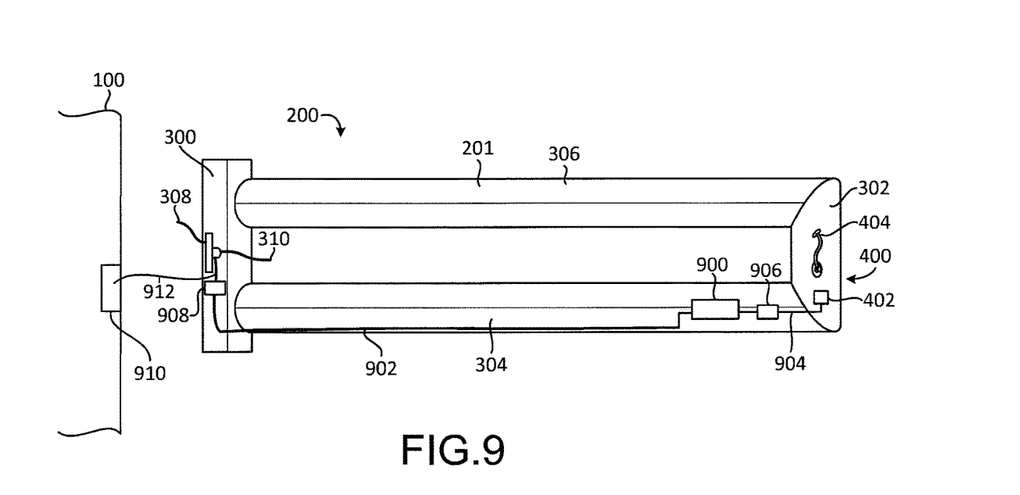
FIG. 9 is a drawing of the inflatable flotation device of FIG. 2 illustrating additional features of the inflatable flotation device, in accordance with various embodiments.

Referring to FIG. 9, a top down view of the inflatable flotation device 200 is shown. As shown, the inflatable flotation device 200 may include a battery 900. The battery 900 may be positioned on or in the inflatable body 201. The battery 900 may be coupled to the light source 308 and the speaker 310 via first wiring 902 and may be coupled to the switch 400 via a second wiring 904. Each of the wiring 902, 904 may include at least one wire capable of conducting electrical current.

In response to the switch 400 being switched to the on state from the off state, a signal may be received by the battery 900 via the second wiring 904 indicating that the switch 400 is in the on state. In various embodiments, the inflatable flotation device 200 may include a logic device 906 that receives the indication instead of the battery 900. In response to receiving this notification, the battery 900 may begin providing power to the light source 308 and the speaker 310 via the first wiring 902. In embodiments in which the logic device 906 is provided, the logic device 906 may control the battery 900 to begin providing power to the light source 308 and the speaker 310 in response to the switch 400 being switched to the on state.

As used in this context, a logic device may include a controller. A controller may be, for example, a computer based-system having a processor and memory. A controller may thus include one or more processors and one or more tangible, non-transitory memories and be capable of implementing logic. The processor can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof.

In various embodiments, the inflatable flotation device 200 may include a second logic device 908 positioned between the battery 900 and each of the light source 308 and the speaker 310. The second logic device 908 may include a non-transitory storage device, such as a memory, that stores the audio data to be output by the speaker 310. In response to the switch 400 switching to the on state, the logic device 908 may receive power, cause the battery 900 to provide power to the light source 308 and the speaker 310, and may also provide the stored audio data to the speaker 310 to be output. In various embodiments, the speaker 310 may include a memory device that provides the audio data in response to the speaker 310 receiving power.

In various embodiments, the aircraft 100 may include a power source 910. The power source 910 may be coupled to the light source 308 and the speaker 310 via additional wiring 912. The additional wiring 912 may include at least one wire capable of conducting electrical current. The switch 400, the logic device 906, or the logic device 908 may be coupled to the power source 910. In response to the switch 400 being switched to the on state, the power source 910 may provide power to the light source 308 and the speaker 310, resulting in the light source 308 and the speaker 310 generating output data.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable flotation device for use with an aircraft comprising: an inflatable body configured to be stored in a deflated state and to be inflated in response to an event, having a proximate end that is nearest to the aircraft during inflation, a distal end that is farthest from the aircraft during inflation, and two sides that each connect the proximate end to the distal end;
   a switch attached to the inflatable body and configured to switch from an off state to an on state in response to the inflatable body being inflated at least one of to or beyond a predetermined inflation level; and level, wherein the switch is an activation lanyard having a base portion attached to a first location on the inflatable body and a detachable portion attached to a second location on the inflatable body such that the detachable portion remains attached to the base portion until the inflatable body is inflated at least one of to or beyond the predetermined inflation level and the activation lanyard switches to the on state in response to the detachable portion being detached from the base portion;
   a speaker attached to the inflatable body, electrically coupled to the switch, and configured to generate an audio signal indicating that the inflatable body is ready for use in response to the switch being switched from the off state to the on state;
   and a battery configured to store electrical energy and wherein the base portion of the activation lanyard is positioned within or attached to the battery.

2. The inflatable flotation device of claim 1, wherein the detachable portion of the activation lanyard includes:
   a line having a first end attached to the inflatable body and a second end; and
   an attachment portion coupled to the second end of the line and configured to be attached to the base portion via a snap fit feature or at least one magnet.

3. The inflatable flotation device of claim 1, wherein the switch is positioned on the distal end of the inflatable body and the speaker is positioned at the proximate end of the inflatable body.

4. The inflatable flotation device of claim 1, further comprising a light source attached to the inflatable body, electrically coupled to the switch, and configured to generate light indicating that the inflatable body is ready for use in response to the switch being switched from the off state to the on state.

5. The inflatable flotation device of claim 1, wherein the battery is electrically coupled to the switch and to the speaker and configured to provide electrical energy to the speaker in response to the switch being in the on state.

6. The inflatable flotation device of claim 1, further comprising at least one wire electrically coupled to the speaker and configured to be electrically coupled to a power source of the aircraft, wherein electrical power is transferred from the power source of the aircraft to the speaker in response to the switch being in the on state.

7. An inflatable flotation device for use with an aircraft comprising:
   an inflatable body configured to be stored in a deflated state and to be inflated in response to an event, having a proximate end that is nearest to the aircraft during inflation, a distal end that is farthest from the aircraft during inflation, and two sides that each connect the proximate end to the distal end;
   a switch attached to the inflatable body and configured to switch from an off state to an on state in response to the inflatable body being inflated at least one of to or beyond a predetermined inflation level, wherein the switch is an activation lanyard having a base portion attached to a first location on the inflatable body and a detachable portion attached to a second location on the inflatable body such that the detachable portion remains attached to the base portion until the inflatable body is inflated at least one of to or beyond the predetermined inflation level and the activation lanyard switches to the on state in response to the detachable portion being detached from the base portion, and wherein the activation lanyard is located at the distal end of the inflatable body;
   a light source attached to the inflatable body, electrically coupled to the switch, and configured to generate light data indicating that the inflatable body is ready for use in response to the switch being switched from the off state to the on state; and
   a battery configured to store electrical energy and wherein the base portion of the activation lanyard is positioned within or attached to the battery.

8. The inflatable flotation device of claim 7, wherein the detachable portion of the activation lanyard includes:
   a line having a first end attached to the inflatable body and a second end; and
   an attachment portion coupled to the second end of the line and configured to be attached to the base portion via at least one of a snap fit feature or at least one magnet.

9. The inflatable flotation device of claim 7, wherein the switch is positioned on the distal end of the inflatable body and the light source is positioned at the proximate end of the inflatable body.

10. The inflatable flotation device of claim 7, wherein the battery is electrically coupled to the switch and to the light source and configured to provide electrical energy to the light source in response to the switch being in the on state.

11. The inflatable flotation device of claim 7, further comprising at least one wire electrically coupled to the light source and configured to be electrically coupled to a power source of the aircraft, wherein electrical power is transferred from the power source of the aircraft to the light source in response to the switch being in the on state.

12. An evacuation system for use with an aircraft comprising:
a source of forced gas coupled to the aircraft; and
an inflatable flotation device having:
an inflatable body configured to be stored in a deflated state and to be inflated by the source of forced gas in response to an event, having a proximate end that is nearest to the aircraft during inflation, a distal end that is farthest from the aircraft during inflation, and two sides that each connect the proximate end to the distal end,
a switch attached to the inflatable body and configured to switch from an off state to an on state in response to the inflatable body being inflated at least one of to or beyond a predetermined inflation level, wherein the switch is an activation lanyard having a base portion attached to a first location on the inflatable body and a detachable portion attached to a second location on the inflatable body such that the detachable portion remains attached to the base portion until the inflatable body is inflated at least one of to or beyond the predetermined inflation level and the activation lanyard switches to the on state in response to the detachable portion being detached from the base portion, and wherein the activation lanyard is located at the distal end of the inflatable body;
at least one of a speaker or a light source attached to the inflatable body, electrically coupled to the switch, and configured to generate at least one of audio data or light data indicating that the inflatable body is ready for use in response to the switch being switched from the off state to the on state, and
a battery configured to store electrical energy and wherein the base portion of the activation lanyard is positioned within or attached to the battery.

13. The evacuation system of claim 12, wherein the detachable portion of the activation lanyard includes:
a line having a first end attached to the inflatable body and a second end; and
an attachment portion coupled to the second end of the line and configured to be attached to the base portion via at least one of a snap fit feature or at least one magnet.

14. The evacuation system of claim 12, wherein the switch is positioned on the distal end of the inflatable body and the at least one of the speaker or the light source is positioned at the proximate end of the inflatable body.

* * * * *